US010524002B2

(12) United States Patent
Hernandez-Mondragon

(10) Patent No.: US 10,524,002 B2
(45) Date of Patent: Dec. 31, 2019

(54) METHOD, SYSTEM, AND APPARATUS FOR MULTIMEDIA CONTENT DELIVERY TO CABLE TV AND SATELLITE OPERATORS

(71) Applicant: Edwin A. Hernandez-Mondragon, Coral Springs, FL (US)

(72) Inventor: Edwin A. Hernandez-Mondragon, Coral Springs, FL (US)

( * ) Notice: Subject to any disclaimer, the term of this patent is extended or adjusted under 35 U.S.C. 154(b) by 0 days.

(21) Appl. No.: 16/152,606

(22) Filed: Oct. 5, 2018

(65) Prior Publication Data

US 2019/0037271 A1    Jan. 31, 2019

Related U.S. Application Data

(63) Continuation of application No. 15/538,911, filed as application No. PCT/US2015/067464 on Dec. 22, 2015, now Pat. No. 10,123,074.

(Continued)

(51) Int. Cl.
*H04N 21/4402* (2011.01)
*H04N 21/2343* (2011.01)
(Continued)

(52) U.S. Cl.
CPC ... *H04N 21/440218* (2013.01); *H04N 21/233* (2013.01); *H04N 21/2387* (2013.01); *H04N 21/234309* (2013.01); *H04N 21/4312* (2013.01); *H04N 21/47217* (2013.01); *H04N 21/6118* (2013.01); *H04N 21/6143* (2013.01); *H04N 21/8106* (2013.01); *H04N 21/8133* (2013.01);
(Continued)

(58) Field of Classification Search
CPC ......... H04N 21/440218; H04N 21/233; H04N 21/234309; H04N 21/2387; H04N 21/4312; H04N 21/47217; H04N 21/6118; H04N 21/6143; H04N 21/8106; H04N 21/8133; H04N 21/8153; H04N 21/84; H04N 21/8547; H04N 21/6405; H04N 21/64322; H04N 21/81; H04N 21/854
See application file for complete search history.

(56) References Cited

U.S. PATENT DOCUMENTS 6,886,178 B1    4/2005 Mao et al.
7,020,888 B2    3/2006 Reynolds et al.
(Continued)

OTHER PUBLICATIONS

International Search Report and Written Opinion dated Apr. 20, 2016 for PCT/US15/67464.
(Continued)

*Primary Examiner* — Rong Le
(74) *Attorney, Agent, or Firm* — Fox Rothschild LLP

(57) ABSTRACT

Systems, methods, and computer-readable media for delivering multimedia content from the cloud to cable operators are disclosed. A device located at the cable headend or implemented in the cloud can receive a request for at least one media stream for playback on a broadcast media channel. Content corresponding to a plurality of multimedia files in the media stream can be obtained from the internet or a cloud based service. The content can be used to generate the multimedia files in a format that is compatible with the cable operator. The multimedia files can be used to assemble the at least one media stream which can be provided to the cable operator for broadcast on the broadcast media channel.

13 Claims, 12 Drawing Sheets

Related U.S. Application Data

(60) Provisional application No. 62/095,504, filed on Dec. 22, 2014.

(51) Int. Cl.

| | | |
|---|---|---|
| *H04N 21/84* | (2011.01) | |
| *H04N 21/81* | (2011.01) | |
| *H04N 21/2387* | (2011.01) | |
| *H04N 21/233* | (2011.01) | |
| *H04N 21/61* | (2011.01) | |
| *H04N 21/472* | (2011.01) | |
| *H04N 21/431* | (2011.01) | |
| *H04N 21/8547* | (2011.01) | |
| *H04N 21/643* | (2011.01) | |
| *H04N 21/6405* | (2011.01) | |

(52) U.S. Cl.
CPC ......... *H04N 21/8153* (2013.01); *H04N 21/84* (2013.01); *H04N 21/8547* (2013.01); *H04N 21/6405* (2013.01); *H04N 21/64322* (2013.01)

(56) References Cited

U.S. PATENT DOCUMENTS

| | | |
|---|---|---|
| 7,320,025 B1 | 1/2008 | Steinberg et al. |
| 8,769,602 B1 | 7/2014 | Del Beccaro et al. |
| 9,418,388 B1 * | 8/2016 | Young .................. G06F 16/954 |
| 10,123,074 B2 * | 11/2018 | Hernandez-Mondragon ............... H04N 21/84 |
| 2002/0138852 A1 | 9/2002 | Reynolds et al. |
| 2003/0115612 A1 | 6/2003 | Mao et al. |
| 2008/0040354 A1 | 2/2008 | Ray et al. |
| 2008/0098426 A1 | 4/2008 | Candelore |
| 2009/0178003 A1 | 7/2009 | Fiedler |
| 2010/0192178 A1 | 7/2010 | Candelore |
| 2012/0204217 A1 | 8/2012 | Regis et al. |
| 2013/0111057 A1 * | 5/2013 | Yoon .................. H04N 21/2225 709/231 |
| 2014/0068690 A1 * | 3/2014 | Luthra .......... H04N 21/234309 725/110 |
| 2014/0098815 A1 | 4/2014 | Mishra et al. |
| 2014/0143437 A1 | 5/2014 | Mathur et al. |
| 2014/0150019 A1 * | 5/2014 | Ma ..................... G06Q 30/0251 725/34 |
| 2014/0344880 A1 * | 11/2014 | Geller ................ H04N 21/8586 725/115 |
| 2014/0351871 A1 | 11/2014 | Bomfim et al. |
| 2015/0319004 A1 | 11/2015 | Kwan et al. |
| 2015/0382081 A1 * | 12/2015 | Reese .................. G11B 27/031 386/282 |

OTHER PUBLICATIONS

Justin Pot: "Save Videos From Any Site—Even Netflix—With Applian's Replay Capture Suite", Jun. 3, 2014 (Jun. 3, 2014), XP055472253, Retrieved from the Internet: URL:https://www.makeuseof.com/tag/savevideos- from-any-site-even-netflix-with-applians-replay-capture-suite/ [retrieved on May 3, 2018].

Fawad Mir: "Schedule Auto Song Recording From Multiple Radio Streams With streamWriter", Jan. 9, 2013 (Jan. 9, 2013), XP055472533, Retrieved from the Internet: URL:https://www.addictivetips.com/windows-tips/schedule-auto-songrecording- from-multiple-radio-streams-streamwriter/ [retrieved on May 4, 2018].

Chris Robley, How to make album art videos for your songs on YouTube, Jul. 16, 2014.

* cited by examiner

METHOD, SYSTEM, AND APPARATUS FOR MULTIMEDIA CONTENT DELIVERY TO CABLE TV AND SATELLITE OPERATORS

CROSS-REFERENCE TO RELATED APPLICATION

This application is a continuation of U.S. patent application Ser. No. 15/538,911, which was filed Jun. 22, 2017, which is a National Stage Entry of International Patent Application No. PCT/US2015/067464, which was filed on Dec. 22, 2015, which claims priority to U.S. Provisional Application 62/095,504, which was filed on Dec. 22, 2014. The complete disclosures of which are incorporated herein by reference in their entirety.

FIELD OF THE DISCLOSURE

The present disclosure provides a mechanism for delivering multimedia content from a cloud-based system to cable or satellite content providers.

The disclosure describes a novel method and a system for continuous media delivery and secured synchronization of multimedia files that are broadcasted to set top boxes or subscriber units in the field that are connected to IPTV or Cable Systems. The present technology can securely connect to a cloud-based platform (e.g. OpenStack, Amazon EC2, Mediamplify Cloud, etc.), creates a set of multimedia files (e.g. MPEG4 movies) into a secured repository (e.g. Secured File System, Linux/Windows, etc.), modifies those files according to certain rules as defined by the method herein, and reproduces those signals via a multicast video stream (e.g. User Datagram Protocol (UDP) multicast, etc.) encapsulated in a Transport Stream (TS) frame that can be a multiple transport stream (several transports in one TS frame) or a single transport stream (one transport stream according to the MPEG-2 Part 1 Specification or similar multimedia streaming that is compatible with MPEG-TS at a predetermined rate or at a variable bit rate).

BACKGROUND

Cable operators, Multiple System Operators (MSO), and Digital Satellite Systems (DSS) deliver media content by utilizing satellite, Radio Frequency (RF) and Integrated Receiver and Decoder (IRD) technologies, which provide outputs that can include Asynchronous Serial Interface (ASI) signal formats. Additionally, MSOs and DSSs use dedicated hardware encoders and transcoding systems if the source video/audio is incompatible with the set top boxes of the cable or satellite operator. In general, the video/audio content delivered via the satellite to the cable or satellite operator arrives via wireless link or receiver, which is processed by an IRD that receives the stream from the satellite and can ultimately broadcast that signal to the cable operator head end in several formats. In addition, some systems may include multicast units connected with IRDs that tune to the right transponder system.

Satellite systems are used to deliver data (e.g. TV, radio, Video-on-Demand, multimedia streams) from a particular source (e.g. third-party content provider) to cable head end systems or other satellite systems. Satellite delivery is performed via a broadcast signal containing digital pictures and audio inside a transponder frequency. Transponders are radio frequency (RF) space allocated in a particular satellite.

For example, a third-party content provider can maintain multimedia files in CD/DVDs, pre-recorded storage, or as pre-recorded files that are reproduced in a particular audio or video encoding format using a video or audio encoder (e.g. MP3, H.264, AC3, and others). The audio and video is then made part of an RF signal that is broadcasted to the satellite system. This signal is then received by the cable or satellite operator using an antenna receptor and is decoded to generate either an analog signal (e.g. RCA Cables or any other analog interface) or digital signal (e.g. ASI, Asynchronous Serial Interface). If an analog signal is received, modern DVB (Digital Video Broadcasting) Cable and Satellite systems will encode this signal to their particular video/audio encoding requirements such that it can be broadcasted in digital packets via a multicast MPEG Transport Stream. The same occurs if a receiver decodes the signal in ASI. As such, this signal is converted from ASI to Ethernet, or simply redirected to a multicast MPEG Transport stream if arriving in a compatible encoding format for the receiving head end cable system.

When no satellite is being used, video, pictures and music, are read out from the DVD or a hard-drive containing MPEG-layer 3 or MPEG-layer 2 files that were encoded at a pre-determined bit rate according. Those video feeds can be reproduced at a synchronized timing using a multicast MPEG Transport Stream using RTP (Real-time Transport Protocol)-based multicast communication and RTCP (RTP Control Protocol)-based mechanisms, as well as standard UDP (User Datagram Protocol) multicast streams with proprietary timing.

Additionally, IPTV systems can provide mechanisms to broadcast a signal using the multicast protocol in MPEG transport streams to a customer premises with compatible set top boxes (same encoder, same streams, encryption keys, etc). A compatible set top box is such that when connected to the cable TV system it can properly decode video/audio from the cable operator's head end system. Some of these IPTV systems rely on CDN (Content Delivery Networks) that enable distribution of multimedia files to IP-enabled devices. For example, a mechanism can be provided whereby a head end content (MSO) that is being broadcasted to a cable subscriber is also available to an IP-enabled device such as a smartphone, PC, or tablet computer.

SUMMARY

Disclosed are systems, devices, methods, and non-transitory computer-readable media for media delivery from a cloud or IP-based distribution network, or CDN (Content Delivery Network) to MSO (Multiple System Operators) or head-ends that include cable and satellite delivery mechanisms. The present technology unifies cloud-based delivery (Mediamplify cloud) with the cable-based mechanism (e.g. Comcast, Verizon FiOS).

An example computer-implemented method can receive, from a content provider such as a cable or satellite operator, a request for at least one media stream for playback on a broadcast media channel. The request for the at least one media stream can include a request for a plurality of multimedia items. Content corresponding to the plurality of multimedia items can be obtained from at least one website or cloud service that offers the content in at least one first format. Based on the obtained content, the plurality of multimedia files can be generated in a second format that is compatible with the content provider. The media stream can be assembled using each of the multimedia items generated in the second format. The media stream can be provided to the content provider for broadcast on the broadcast media channel.

In some aspects of the present technology, obtaining the content can include retrieving at least one audio file corresponding to an audio component of the multimedia item and retrieving a plurality of images as screen captures that can correspond to a video component of the multimedia item. Generating the multimedia files in the second format can include combining the plurality of images and the at least one audio file to create each of the multimedia items.

BRIEF DESCRIPTION OF THE DRAWING

There are shown in the drawings, embodiments which are presently preferred, it being understood, however, that the disclosure is not limited to the precise arrangements and instrumentalities shown

DETAILED DESCRIPTION

The following description should be read with reference of the drawings, in which like elements are numbered in similar fashion. The drawings are not necessarily at scale and are not intended to limit the scope of the disclosure. Those skilled in the art understand that there are alternatives that may be used as well which are also considered to be within the scope of the disclosure.

Figure 1:
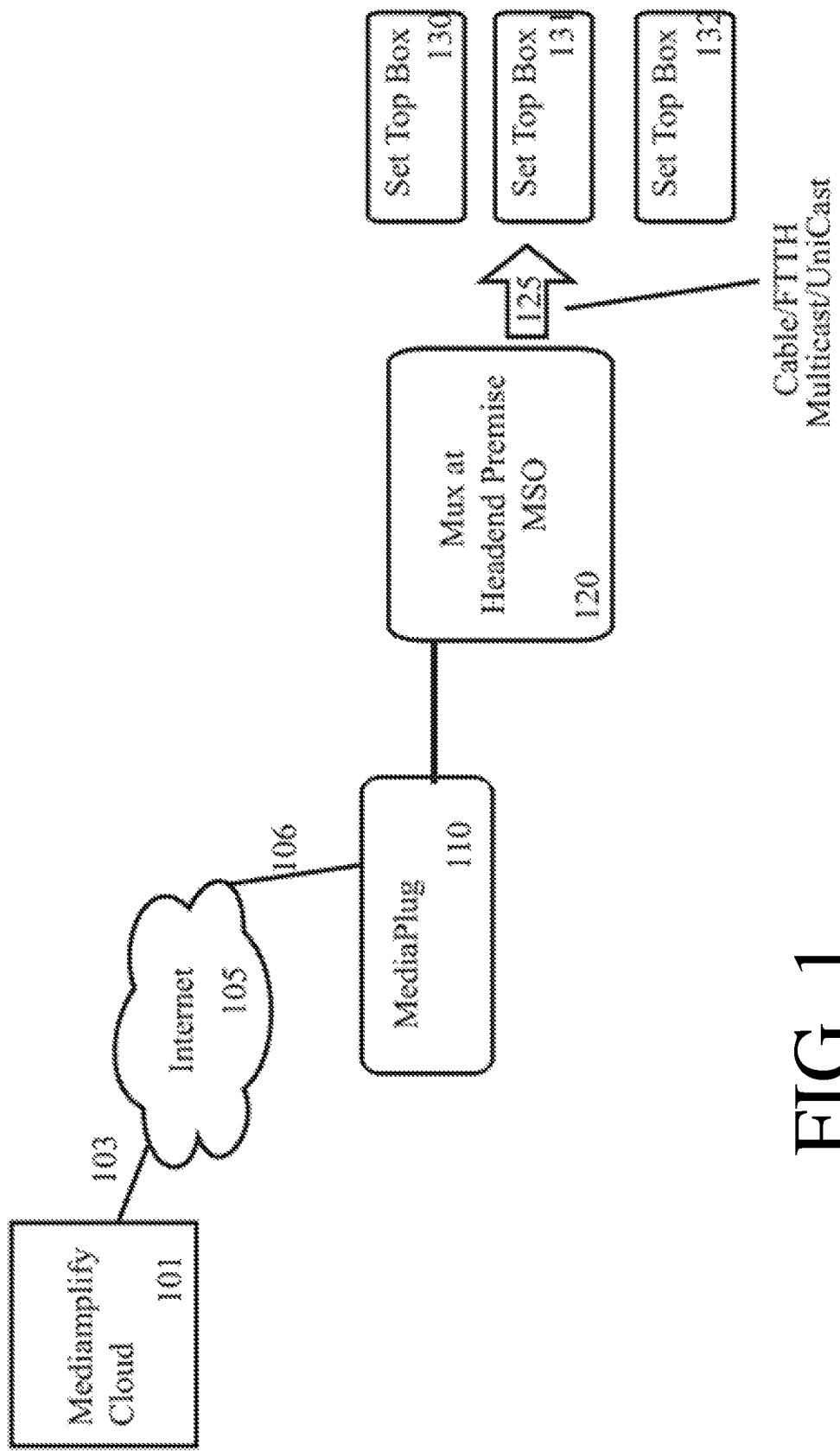
FIG. 1 shows an example block diagram illustrating an exemplary head end (MSO)

Generally, the disclosed technology pertains to a delivery mechanism for providing multimedia content to cable systems without the use of a satellite system in a fault-tolerant and reliable fashion. FIG. 1 illustrates a block diagram that includes a Mediamplify Cloud 101. The cloud 101 can refer to a set of virtualized instances or non-virtualized instances of one or more servers that provide access to archives and digital files with media content stored in them. For example, the cloud 101 can be implemented using VMWave or Xen and OpenStack, or simply reside in Amazon Web Services or Rackspace. In addition, special provisioning can be provided in cloud 101 for secured access.

The cloud 101 service files can be accessible via the internet 105 and can be stored in a cloud-based file system or cluster file system (e.g. GlusterFS or Hadoop, Amazon S3). These files can be multimedia files that include, as non-limiting examples, MPEG-4 Video files with H.264 encoded video and AAC encoded audio or MPEG-layer 3 audio as well (MPEG2 Video could also be used). These files can be accessed using a secured transport protocol such as, but not limited to, SSL or a synchronization tool as "rsync," commonly found in Linux/MacOS environments. The communication link 106 can be a DSL, Cable Modem, Wireless WAN, Fiber, Metro Ethernet, etc. and can be linked with the MediaPlug 110 unit. The Mediaplug 110 can reside at the "MSO" facility and can be collocated with all the cable or satellite operator equipment. The MSO is a facility used by the Cable Operator to receive all TV and Radio Programming that the cable operator will then multiplex, re-encode, and distribute from the MSO to a set of subscriber units with set top boxes, or modulate the signal in TV analog channels (2-60+).

One function of the MediaPlug 110 is to provide multimedia content, e.g., video and audio, to an MPEG multiplexer at the headend 120. The content can be pre-formatted in MPEG Transport Streams that the multiplexer 120 (e.g. Arris TMX-2010) will then be able to capture, reformat in any way the operator requires, and deliver to the cable operator's subscribers via Coaxial Cable 125 or any other means suitable for a multicast or unicast delivery to its customers with "Set Top boxes" 130, 131, 132. A "Set Top Box" is customer premise equipment that will be able to decode and display in a TV set or other screen display, via a signal received by its HDMI or analog input, the contents of the TV programming the cable operator offers.

The Mediaplug 110 can be a computer or server or set of computers of servers that can communicate with the Cloud 101 using a standard Local Area Network (e.g. Gigabit Ethernet). The Mediaplug 110 can store, encode, and transmit multimedia files in the format that the cable operator at its MSO requires. This cable format may include audio, video, and metadata (subtitles, control data, and any additional component that can be packaged in an MPEG Packet that is part of the MPEG Transport Stream). In one embodiment, Mediaplug 110 can include components such as a caching unit, and one or more multicasting servers.

Figure 2:
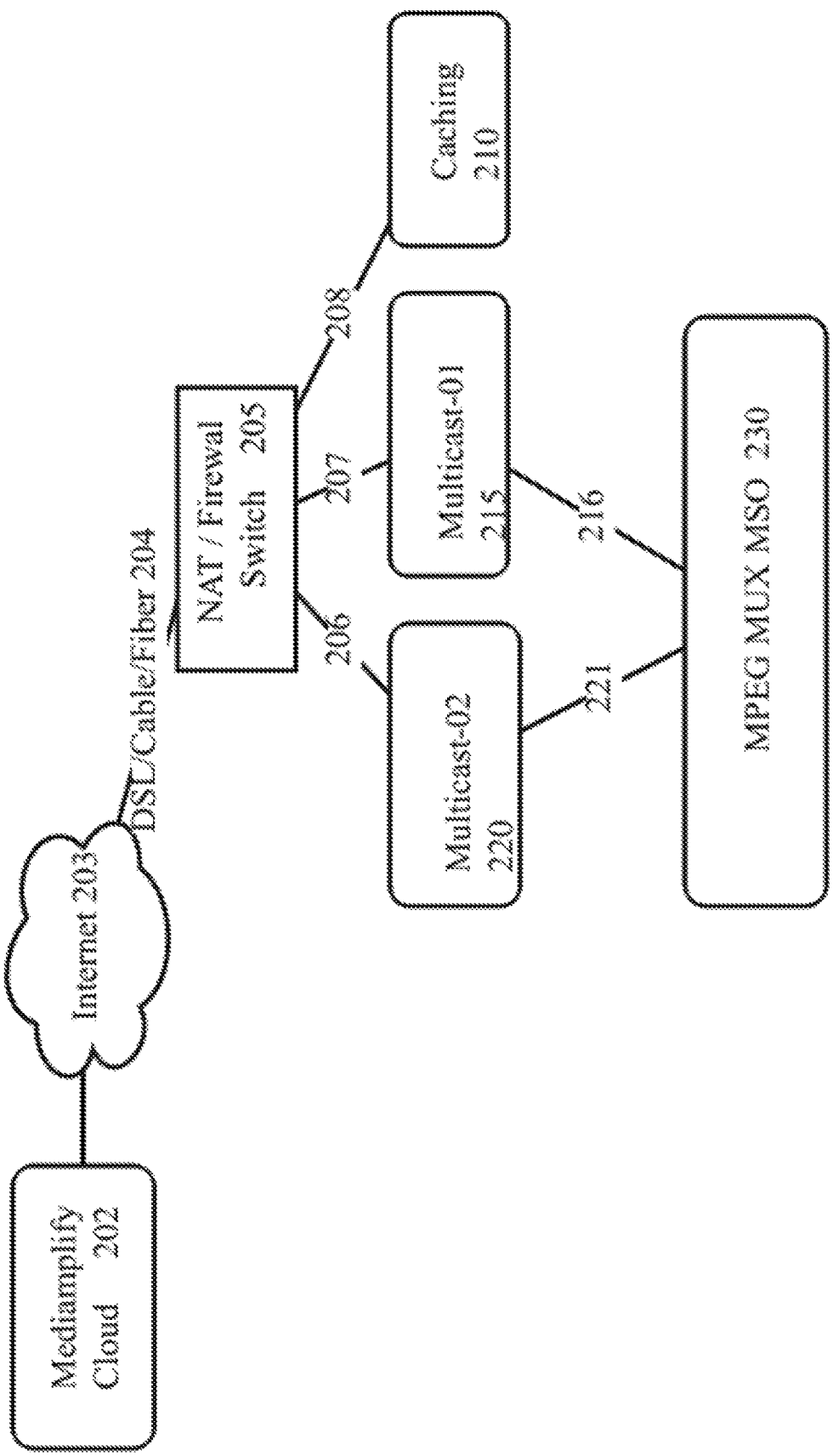
FIG. 2 shows an example block diagram of the apparatus located at the MSO facility (mediaplug)

FIG. 2 illustrates an example configuration of the hardware components of Mediaplug 110 which includes three servers. A server is a computer device, usually rack mountable unit with volatile memory such as RAM, one or more micro-processors, and non-volatile memory such as a hard disk. However, one skilled in the art will recognize that the present technology is not limited to a particular configuration and can be varied according to different specifications. FIG. 2 illustrates Mediamplify Cloud 202 which is connected to the Internet backbone 203. Link 204 (e.g. DSL, Cable Modem, Fiber) provides connectivity between cloud 202 and a Network Address Translator unit 205 (e.g. Cisco RVS4000, or any other NAT device) which can provide Gigabit Ethernet switching capabilities. The lines 206, 207, and 208 show Gigabit Ethernet links, however one skilled in the art will understand that Gigabit Ethernet or a Wireless LAN using 802.11g/n would be also a suitable interface to be used in a Mediaplug configuration. The Caching unit 210 can be the main storage component in the system and it can contain all of the multimedia files in the format required by the cable operators, such as the Transport Stream format. The caching unit can communicate with Multicast-01 215 and Multicast-02 220. The two Multicast units 215, 220 can pull or obtain information from the caching unit via TCP/IP or UDP, using protocols such as HTTP (Hypertext Transport Protocol) or RTSP (Real-time Streaming Transport). The caching unit can also encode and transcode the multimedia files it downloads from the Cloud 202. The caching unit can also keep updated information of all the metadata and create customizable screens that can be converted into video formats compatible with the Transport Stream content that will be provided to the cable operator at its MSO. MPEG MUX MSO 230 can correspond to a program residing in a computer system that processes and handles the MPEG streams from multiple sources. The MUX 230 can also function as the bridge between the source of the signal and the customer's set top box units. A non-limiting example program would be the CherryPicker DM6400 by MOTOROLA. Each of the components or modules of the Mediaplug can include software for performing functions and/or methods according to the present technology.

Figure 3:
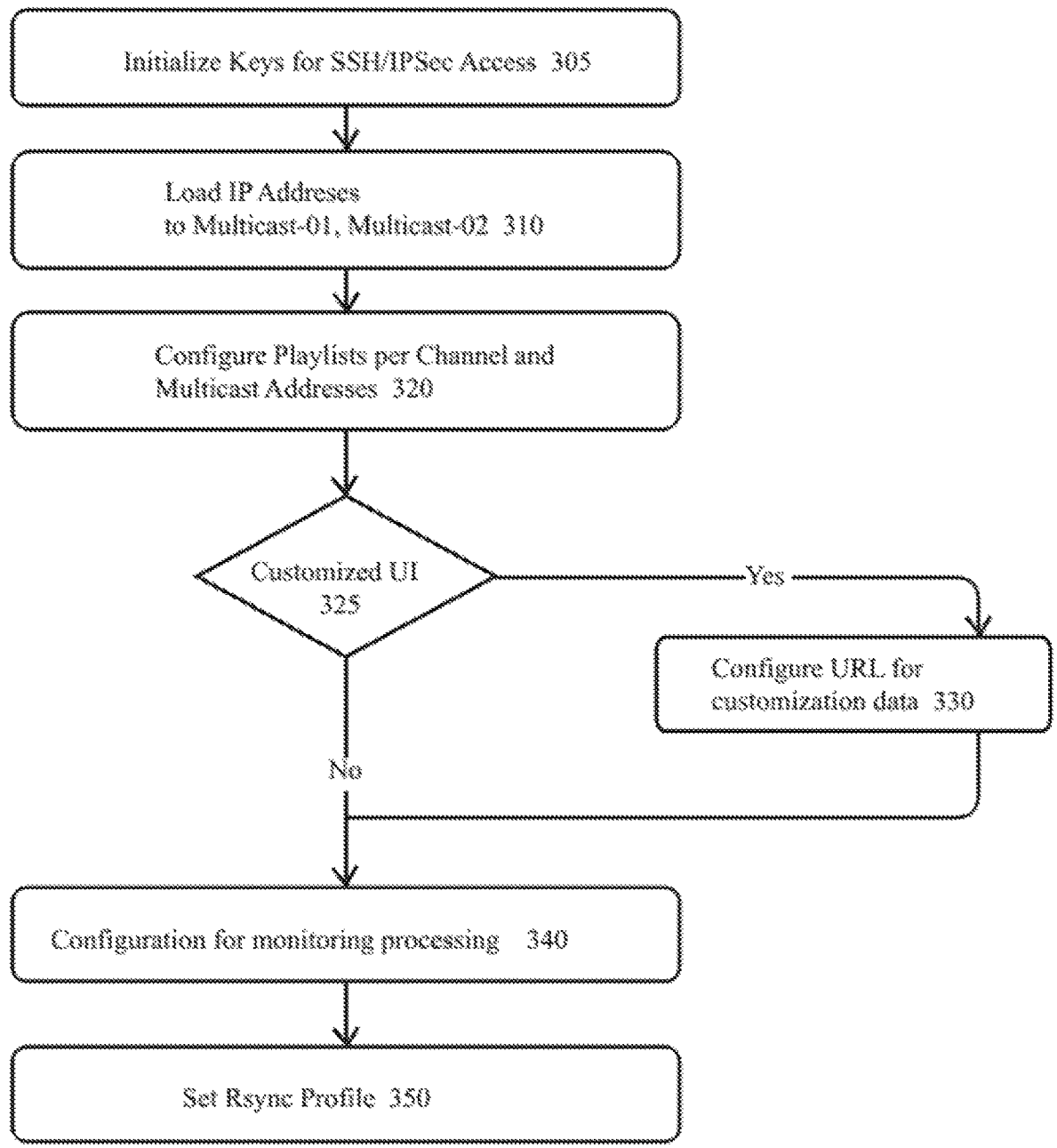
FIG. 3 shows an example method for initialization of Mediaplug components.

FIG. 3 illustrates an example method that can be used to configure and provision the units at boot-time. Each unit can initialize keys for SSH/IP Sec access at 305. For example, the units can use IPSec and SSH Tunnel keys that can be stored in the administrator user account. The keys can be generated by the Mediamplify Cloud that are private keys or certificates, shared secrets or similar components by which the Mediaplug can connect securely with the Mediamplify cloud. Each cable operator can provide custom-based IP addressing at 310 for the Gigabit Ethernet ports that connect to the operators' network. Changing the IP addresses of the Multicast-01 and/or Multicast-02 refers to the IP address by which the links 221 and 216 in FIG. 2 are linked to the MPEG MUX MSO unit. A change of the IP address can refer to the 'ifconfig' command which is used in Linux-based systems and that can be changed in an Ubuntu box at/etc/network/interfaces file. Similarly, the network routing can be changed if the multicast address cannot be routed to the default gateway which points to the 205 NAT, but to 221 and 216 respectively for Multicast-02 and Multicast-01. In general, the **239.\*.\*.\*** network address may be routed to those interfaces.

At step 320, the Mediaplug can configure playlists per channel and multicast address. The playlist and channel configuration can be obtained from the cable/satellite operator and can include any number of channels for broadcasting multimedia content to end customers. As an example, the channels may include music channels corresponding to different music genres, e.g. rock, alternative, classical, jazz, hip hop, etc. Based on the particular genre, a corresponding playlist can be selected and/or configured. The Mediaplug can also determine the multicast address for each of the channels.

In some configurations a customizable user interface (UI) can be added to the output video MPEG Transport stream. As such, if the "Custom UI" variable is then true and valid, 325, a link or URL 330 is loaded into the Mediaplug configuration that can be used when the video interface is created. The custom video interface can be created and fetched as needed or it can be created in real-time for a particular channel or for all the channels. The custom user interface variable can be uniquely configured per channel in the Mediaplug. The mediaplug can also monitor 340 all of the processes to ensure stability and continuous, uninterrupted operation. The initialization of the Mediaplug can also include setting the RSYNC profile 350. The RSYNC profile can be used to update and synchronize media content with the cloud when the Mediaplug determines that the content has changed or been modified.

Figure 4:
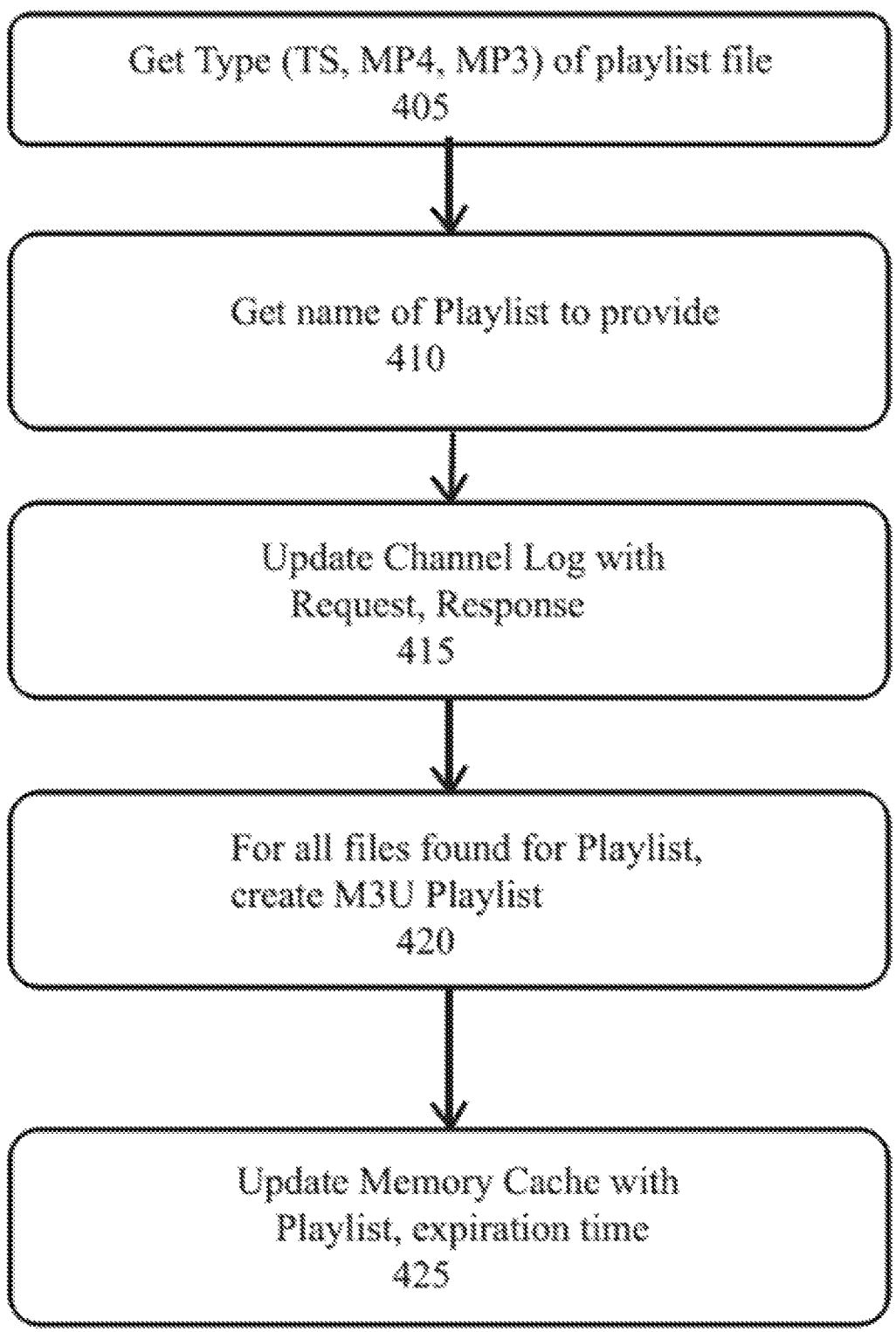
FIG. 4 shows an example method to obtain list of files to multicast to a cable operator MSO.

As described above, the Mediaplug can broadcast the multimedia MPEG stream using the programmed IP Address in multicast-01 and multicast-02 according to the method illustrated in FIG. 3. In FIG. 4, an example method is shown for obtaining the list of files to playback or broadcast to the MSO system. The file type or format requested by the multicasting embodiment, e.g. multicast-01 or multicast-02, can include Transport Stream (e.g. TS) and/or MPEG-4 Part 14 (e.g. MP4) values 405. This request is executed from any of the multicasting embodiments, usually making use of the HTTP GET Request. The multicasting unit can connect to an HTTP Server and retrieve the list of files based on the type identified by the request. As the caching unit may handle multiple channels of different types and name, each channel can have a unique identifier corresponding to the name of the playlist. For example channel name "Cool" or "Rock," 410 are names that can identify the channel to be retrieved from the caching server. The activity log in the request can also be updated keeping track what step of the process is being completed 415. At 420, the caching server can generate a "playlist file" of mime type "audio/x-mpegurl" which will be interpreted as a multimedia playlist file when requested. Finally, as the playlist usually may not vary for a period of time until a new request is received, the playlist can be kept in the local memory caching service 425.

Figure 5:
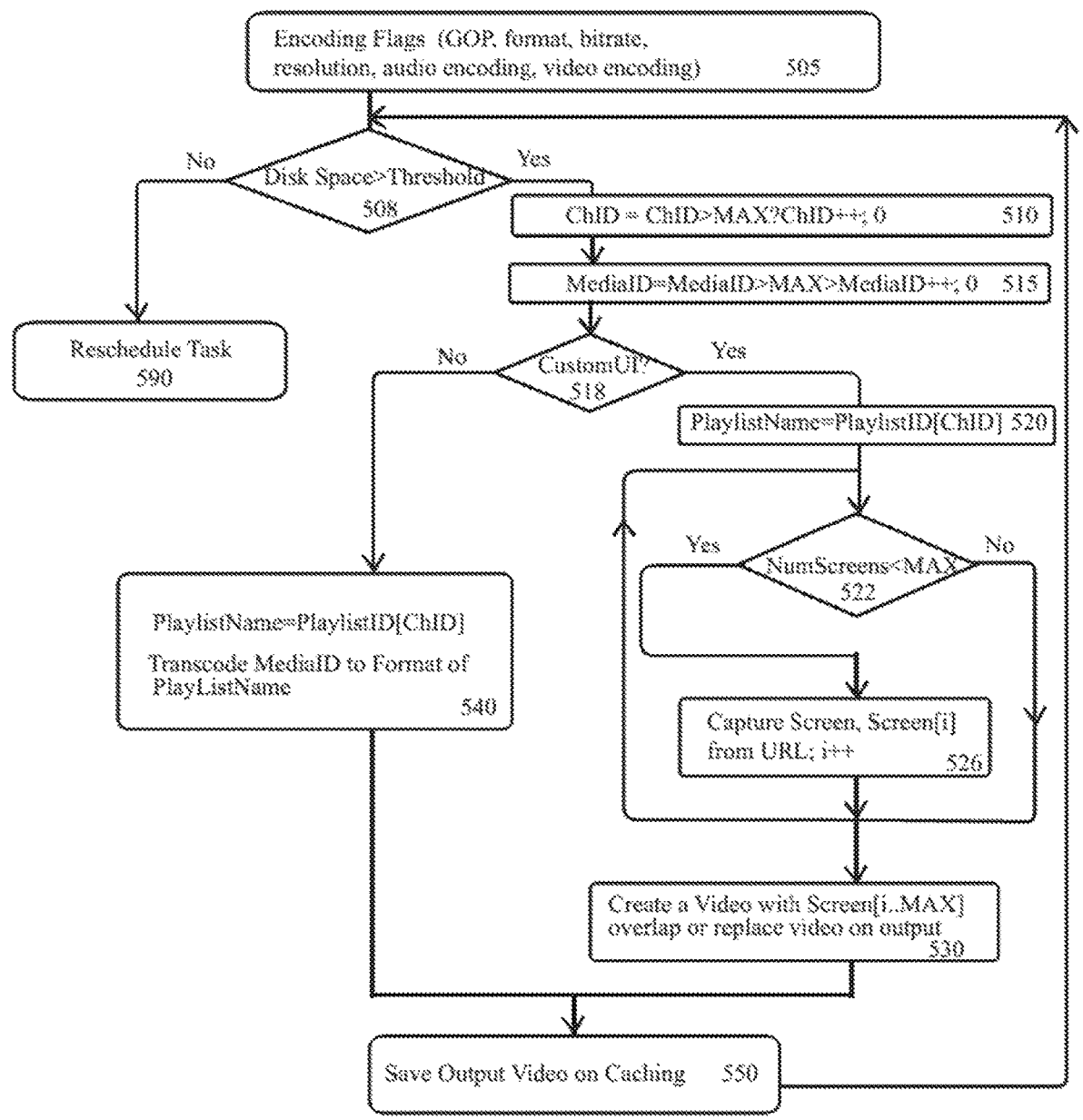
FIG. 5 shows an example method for encoding video and audio files.

As the requests arrive at the "Caching" unit from the multicasting units, the "Caching" unit can be configured to perform parallel encoding for all the different channels available from the unit. FIG. 5 illustrates an example method that can be implemented by the Mediaplug, and in particular, by the "Caching" unit. At step 505, encoding flags or input parameters can be received which may include GOP (Group of Pictures) which is used by certain video encoders, resolution (e.g. 640×480) in pixels, bit rate in Kilobits per second, any encoding type of video (e.g. H.264), encoding type of audio (e.g. AC-3), duration of the video feed, etc. In addition, a "format" parameter can be received which refers to the output format or encapsulation, MPEG TS or MPEG4. The caching unit encodes audio and video, and can use the disk space in the Mediaplug. Hence in 508 the method checks for sufficient space left in the memory or hard drive. This task can be run on a thread together with all the other tasks that are working in parallel in order to speed up the processes of encoding and transcoding.

Several indexes or identifiers by the name "ChID," (these integers preferably no more than an integer value from 1 to the maximum number of channels) begin (e.g. MAX could be 50) to be generated by the caching unit 510. This method can be performed for all the channels and all media linked to that particular channel identified by "MediaID" 515, in this particular case the "MediaID." The variable "MAX" in this context can refer to the maximum number of media files read (e.g. 500). The data captured from the media could be "Artist," "Author," or any other variable from an audio file. If a video file is used this could be "program name," "movie name," or any associated metadata information tied to the multimedia file and the Channel Identifier (ChID) associated with it "MediaID" file.

The caching unit can add a "Custom UI," or a customizable User Interface that is designed using Hypertext Markup Language (e.g. HTML) or a web service. A web service that matches a REST interface (Representation State Transfer) and uses Javascript Object Notation (JSON) or XML (Extensible Markup Language) to respond to a custom UI request can be used. Moreover, this custom UI can include JavaScript, CSS, and HTML content files that can be rendered using a browser using WebKit (e.g. PhantomJS or Safari) or any other browser-rendering engine compatible with HTML4/5 or any future HTML version. If a customizable UT is part of the configuration 518, rendered images from a web service can be used to create overlapping video or replace any video in the video feed file. Likewise, this video or customized screen can be used when no video at all is defined in the multimedia file, e.g. Audio-only file. The web-service to be contacted may use the "PlayListName" to be used for the Channel identified by the channel ID "ChID," retrieved using the "PlaylistID" function 520. Each new PlayListName may contain different identifies to retrieve new images. Therefore one or more screens will be retrieved from the rendering engine as such 522 can be used to retrieve a set of screens from the web-service being contacted.

Capturing screens 526 can be done using a tool similar to PhantomJS (Webkit-based headless engine for rendering images) or QtCapture, or simply capturing screen frame buffers from a machine running any software tool. Alternatively, the method can capture a video file from another rendering function, which can create a sequence of screens that can be used to generate a video file. Once all screens and video are captured, 530 the resulting output created can be a video file that then is either replaced or merged (multiplexed) with the original file. As an example, if an audio content file is used such as an MP3 file, this function can create a video file from all the screens captured by 526. Those screens are generated by calling a URL where the web-service is associated and creating a video file with the input audio and the captured screens. The output format can be an MPEG Transport Stream file that can be retrievable or streamed to the multicasting embodiment.

Once the output file containing the screen shoot sequence of videos encoded in H.264 (for example, or MPEG2Video) is created, the audio can be multiplexed and added to one of the encoding channels of the resulting video output and saved into the caching unit storage disk 550. The multiplexing can be done using tools such as FFMPEG or VLC or any proprietary tool that can multiplex audio and video files into a resulting MPEG Transport Stream (or MPEG-4 output, or any similar output).

Figure 6:
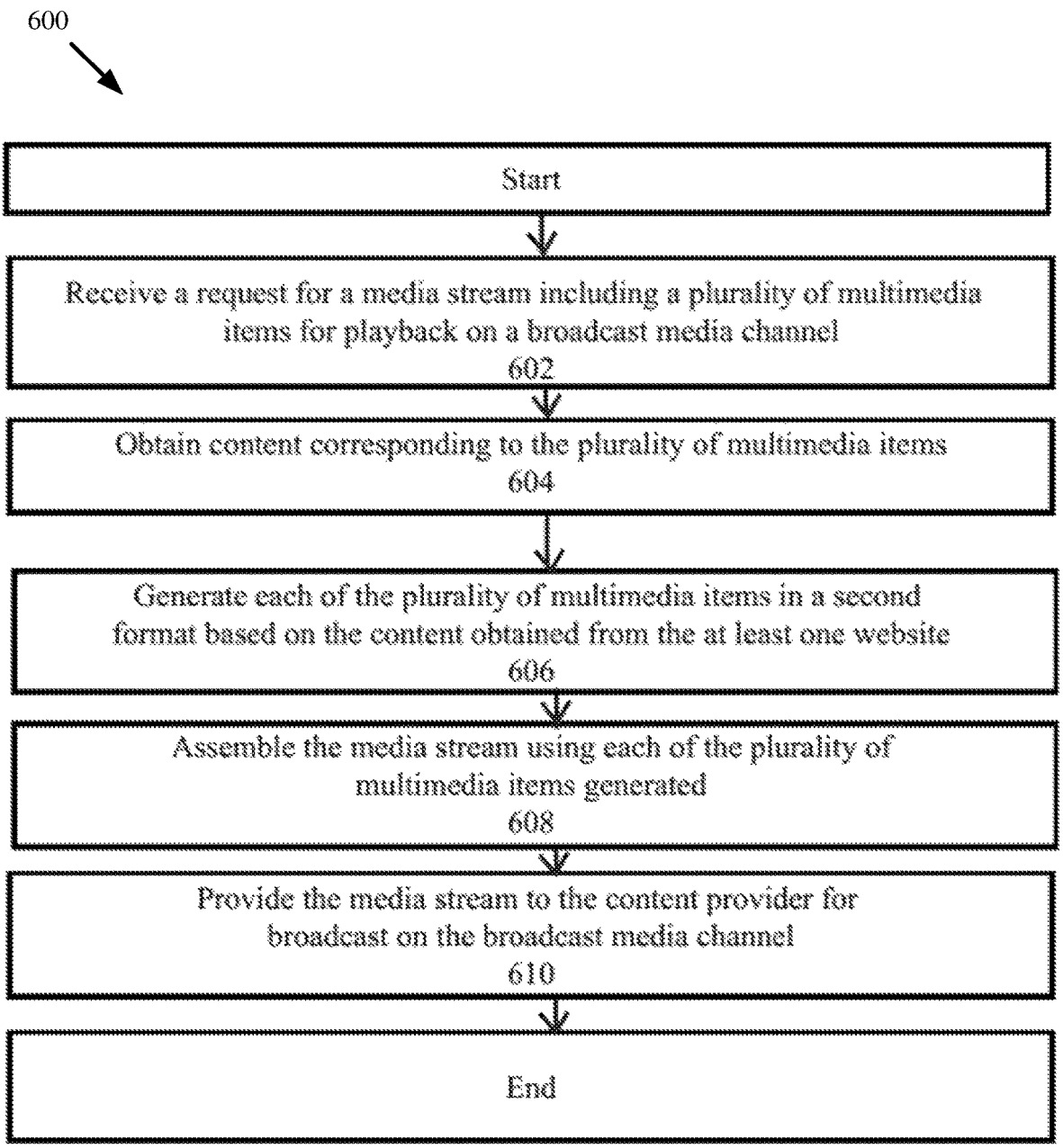
FIG. 6 shows an example method for providing multimedia content to a cable operator.

FIG. 6 illustrates an example method 600 for providing multimedia content to a cable operator. At 602, a device such as the Mediaplug device receives a request from a cable/satellite operator for a media stream. A media stream can be formatted according to HTTP Live Streaming (HLS), an HTTP/RTSP playlist, or an RTSP stream. The media stream can include any number of multimedia items such as audio/video multimedia items. In some instances, the request can include a channel identifier that is associated with a particular category of multimedia items, such as a music genre corresponding to rock, classical, jazz, etc.

At 604, contents corresponding to the multimedia items can be retrieved, downloaded, or otherwise obtained from one or more websites or cloud based servers. The contents can include data corresponding to either or both of the audio and video components of the multimedia items. For example, the data corresponding to the audio portion can include a music file in an MP3 format. Similarly, the data corresponding to the video portion can include a video that is obtained directly from the cloud. Alternatively, the video component can be assembled by using one or more screen captures from a website. The screen captures can include captures of still images presented by the website as well as captures of images from videos that are available on the website. As illustrated in FIG. 5, the screen capture process can be repeated any number of times.

The Mediaplug can then generate 606 multimedia items in a second format based on the content obtained from the web server or cloud. That is, the Mediaplug can convert/encode the audio file into a format that is suitable for the cable operator and it can also assemble the various screen captures to generate the video component of the media item. Once the audio and video files are created, they can be combined, multiplexed, or encoded to a format that can be utilized by the multimedia stream. For example, the audio can be multiplexed and added to one of the encoding channels of the video output. The various multimedia items can be used 608 to assemble the media stream in a format corresponding with the request (e.g. HLS, HTTP/RTSP, RTSP stream). The media stream can be provided 610 to the content provider for broadcast on the broadcast media channel.

Figure 7:
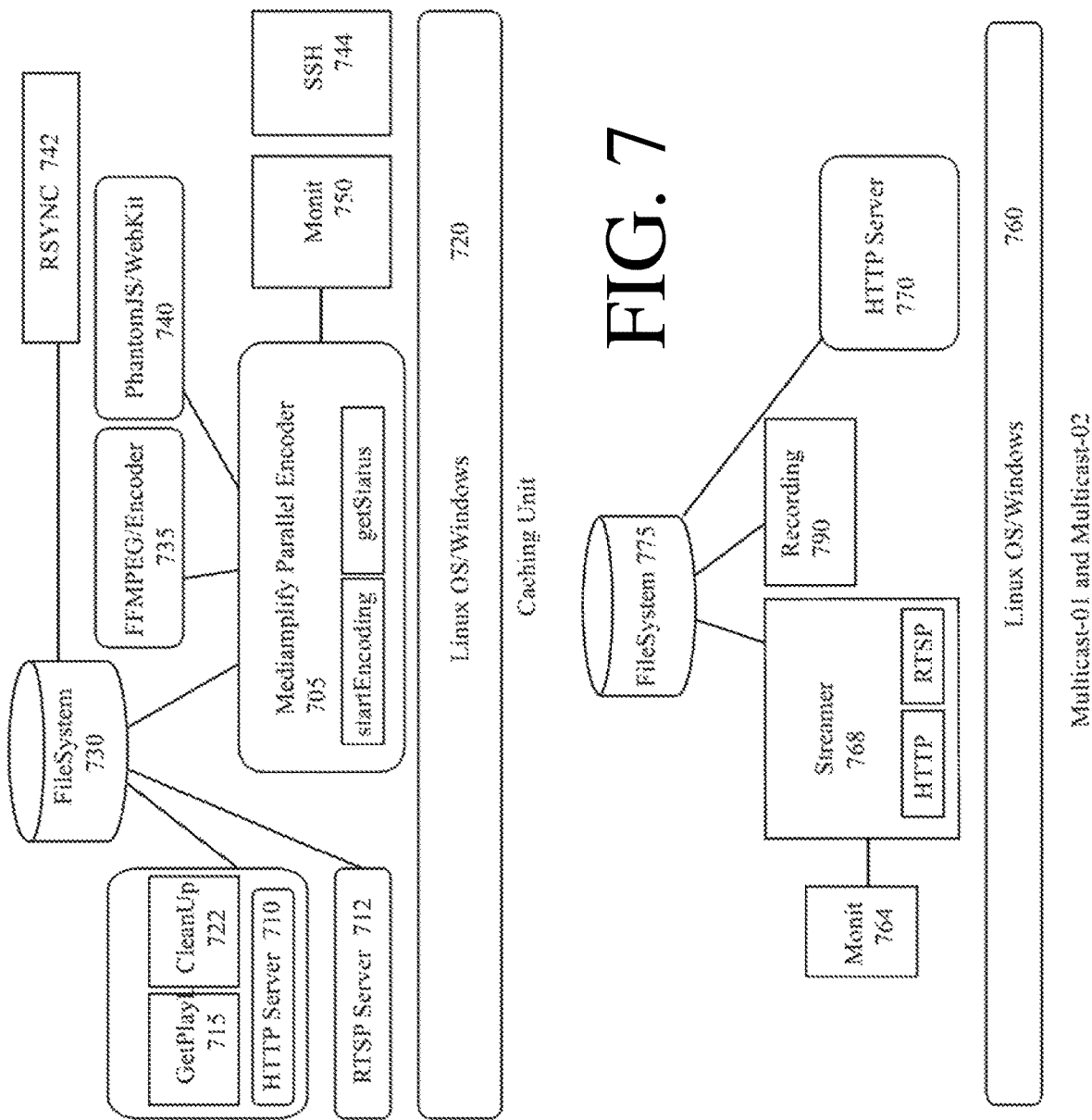
FIG. 7 shows an example block diagram of example software components of the Mediaplug.

FIG. 7 illustrates a block diagram of an example architecture of the Caching Unit components. The figure shows 720 as the main operating system, which can be Linux, Windows, or any other operating system in use. The caching unit can contain two types of operating system services HTTP 710 and RTSP 712. The RTSP service provides access so the media saved or created in the repository of the caching unit file system 730. The RTSP server can be implemented using the Live555 RTSP server or similar. Alternatively, the HTTP Server can be implemented using "nginx" or "apache" web browsers, and the RTSP Servers can be implemented using Live555 services. In the case of the HTTP Server, this can also be used to get the Playlist of files generated from the method on FIG. 5 715.

The GetPlayList 715 command can be implemented as follows:
- Receive and process a request for the name of the channel or playlist to be used,
- Retrieve all the filenames ordered by date of creation of all the files in a particular directory,
- Cache all the files into cache memory (e.g. Memcache or similar tool),
- Add type of HTTP header as M3U or PLS (e.g. a text file with a list of files or URLs to play),
- Return a list of HTTP or RTSP URLs to access each video generated or stored in the caching unit.

In some embodiments, the HTTP Server can also be used to clean up, update, and delete operations. The block unit called "CleanUp" 722 is in charge of keeping up to date caching information data and/or deleting files already used or that are not required to be used anymore by the multicast unit(s). Also the HTTP Server functions can include servicing M3U8 files corresponding to the HTTP Live Streaming format and all the segments created by the HTTP Live Streaming function. As such, a HTTP Live Streaming (HLS) generation program will produce the files and segment them as needed by the encoder and can then be serviced by the HTTP Server 710. The Mediamplify Parallel Encoder 705 corresponds to a block that can implement the method shown in FIG. 5. The resulting outputs from the Media Parallel Encoder 605 are stored in the file system 730. The Mediamplify Parallel encoder 605 can be implemented in Python and can rely on web services (such as Twisted or Django), PhantomJS, and FFMPEG. Monit 750 corresponds to a monitoring block that can ensure that the process running the "Media Parallel encoder" keeps running at all times and does not stop upon failure. Additional blocks that can be included in Mediaplug are RSYNC 742 and SSH 744.

These blocks can be used to ensure synchronization and updates of new media files coming from the cloud. The RSYNC block uses the "rsync" protocol and program over ssh (Secured Socket Layer Shell) to download media from the "Mediamplify Cloud" and synchronize multimedia files that are newly updated and could be part of particular Channel ID and a Playlist Name. Each new file synchronized with the Mediamplify cloud has a Media ID value which the cloud can assign, and include additional metadata information such as "Artist" and "Author." The "Mediamplify Parallel Encoder" also may receive requests from other components such as getStatus or StartEncoding, indicating what file is being encoded, its progress, and what other files are in the queue for encoding.

In some embodiments, the information from getStatus or StartEncoding can be generated using a JSON message retrieved upon a request via HTTP GET to the Mediamplify Parallel Encoder. A graphical user interface can then be used to plot the status of each song being encoded or provide previews of the videos being generated. Below is one non-limiting example of a JSON response made by the "Mediamplify Parallel Encoder" service:
{"song_encoded": "ts", "artist": "Madonna", "duration": 0, "exists_on_disk": True, "genre": "Pop", "title": "Like a Virgin", "music_id": "1082863"}

Response regarding the tatus for a song being encoded or a list of songs being encoded, as follows:
{"music_id": "109281", "encoding": "78%", "output_file": "/var/www/eglacast/pop/109281-abcdef-uuuid.ts", "thumbnail": http://mediamplify.com/images/abcdef-uuid.png"}

In some embodiments, there are two possible TCP/IP sockets open for listening used by the Caching component of the Mediaplug. A) Port 80 (as an example), or the standard HTTP port, used to retrieve content, view video content generated, update/delete cached files, and access the playlists, and B) Port 9553 (as an example), or the standard Mediamplify Parallel encoder port, used to monitor and review status of the songs being encoded, the data being collected, and all other related activities with encoding. Via this port, encoding/transcoding can be started or stopped.

Similarly, the "Mediaplug" components labeled "Multicast-01" and "Multicast-02" can also provide an HTTP interface to access the current song being played or being multicast via the HTTP Server 770. For example, the HTTP Server may run a PHP or Python script that will return the current song being played by the streamer. The streamer block 768 can connect to the caching server via HTTP or RTSP protocols. The implementation of this block can be done using a combination of FIG. 8 instructions and using multicasting services available in VLC or FFMPEG (e.g. multicast, or tstools/tsplay).

One function of the streamer 768 is to read the files encoded by the caching unit, process those for multicasting and creating the MPEG Transport Stream multicast packets sent via the Ethernet port. Additionally, the multicast-01 and multicast-02 blocks contain a "Recording" function 790, which is in charge or recording the multicasting streams and recording for later use in case of failure on the system. This operates by listening into the UDP (User Datagram Protocol) multicast address of each individual channels being broadcasted, and recording the output into a file. This file is then stored and made accessible for future use. Monit 764 can maintain the streamer process running at all times throughout a regular broadcasting cycle.

Figure 8:
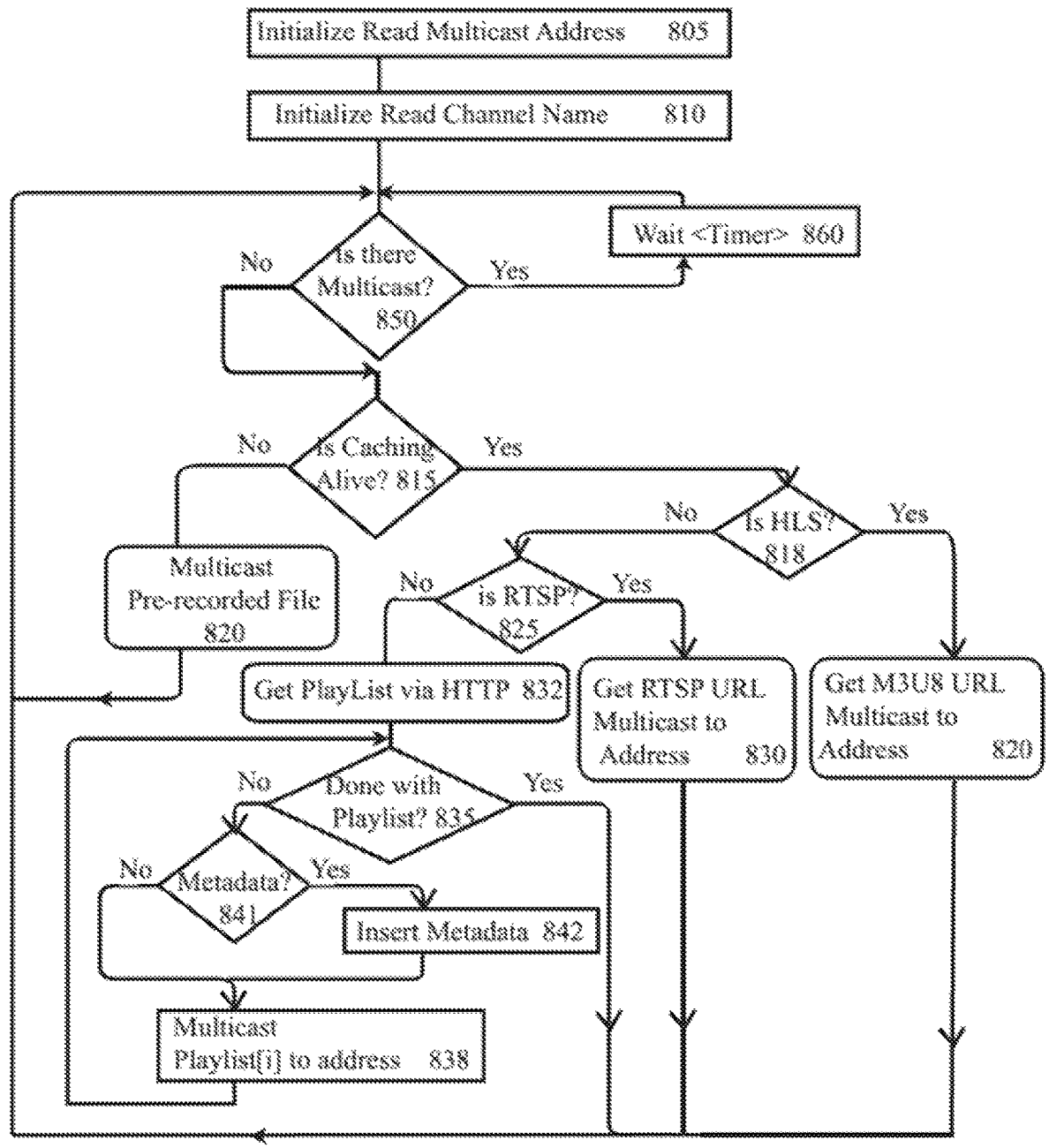
FIG. 8 shows an example method to multicast from a component in the Mediaplug.

FIG. 8 illustrates an example method that can be performed by the streamer module in the Mediaplug. In one embodiment, the streamer can perform functions that include: connect to the caching unit; retrieve generated videos per playlist; determine if unit is working in fault-tolerant mode; playback pre-recorded audio if a failure is detected; and record units own output or any other streamer output if connected to switch or hub.

Turning to the method from FIG. 8, at step 805, the streamer reads the multicast address associated to the channel being broadcasted, in order to generate IGMP (Internet Group Management Protocol) messages and establish a multicast group (e.g. 239.0.0.1:8001). The channel name is also initialized at 810. This value can be used to retrieve the proper content from the Caching server. In one embodiment, a configuration table can be created with tuples: <ChID>, <Channel Name>, <Multicast Address>, <Multicast Port>, such that no duplicates are used or created. Automation software can create these configuration tables and automate the process of creating all streamer calls. A streamer method can be called (e.g. from /etc/init.d/) at boot time and monitored with a tool such as Monit. Once the configuration is known, the streamer will check 850 if there are already multicasting transport streams generated by any other multicast component and avoid collisions. If such multicast data is detected, a delay can be used to delay a new attempt to check on that particular multicast group 860. Hence this block indicates "Wait <Time>" or stop all processing for the amount of <Time> recommended by the specification. For example, the time for delay can be the "Main source" of input less the amount of time for receiving input from a backup server. During initialization, if the same multicast address is used to broadcast main and backup, the one with less amount of time delay will be first, followed by the "Backup." In cases were a hot spare is used, or two different multicast addresses can be in use, one for main and the other one for backup, then this step may be optional.

Once it is determined that there are no elements multicasting at the same address, the streamer will check if the Caching server is "alive" 815. This can be performed in multiple ways, for example an HTTP Request must not generate a 404 or 403 error, but instead a successful 202 value. Likewise, ping requests can also be used before making an HTTP GET call to identify if the caching server is present and available. In the case that there are no ping responses, a timeout will trigger a failure and a pre-recorded content 820 will be played or sent to the multicast address and port of record. Recordings can be scheduled daily for an extended period of time (e.g. 8 hours or more). These recordings can store the recorded file in a temporary folder and then move that file over to the playback folder where streamer can read it.

If it is determined that the caching server is functioning properly, then there are three types of streams that can be sent to the multicast address and port:

HTTP Live Streaming (HLS) a multi-segment stream usually defined by extension M3U8, containing a set number of segments for a real-time stream source (Video/audio)

HTTP/RTSP file playlist, this means that one or many files are read from the caching server, usually defined by extension M3U or PLS RTSP stream, this could be constant stream similar to HTTP Live Streaming (HLS) but using an RTSP protocol instead of HLS stream.

When multiple files are part of a playlist, the bit-rate may vary between playlist files. Different bit-rates among files in a playlist could cause problems in non-CBR (Constant Bit Rate) systems. To avoid such problems, the Mediaplug can maintain the stream at the bit rate of the previous stream by adding null MPEG TS packets at the same rate as the previous media file was being sent over the multicast port. This will maintain appropriate bit-rate for playlists.

In RTSP service, streaming occurs by writing the media content to a named pipe or a FIFO file and allowing the RTSP service to read from that file and generate an RTSP stream. As such, in HLS and RTSP Streaming, the caching server knows the filename of the file being streamed. When the file is streamed from via playlist, both the caching and multicast unit know the name of the file being streamed, as the multicast server can then request from the caching server the metadata associated with the file name being streamed.

Accordingly the present technology can accommodate both cases and retrieve the current file name being streamed as a JSON response. The response can identify the content displayed or played hack at the end-user's set top box.

If HLS is used for streaming 818, the streamer will connect to the proper M3U8 file 820 to pull all the segments corresponding to the live playlist file on the M3U8 stream. Programs and libraries such as FFMPEG or VLC can then be used to encapsulate the stream feed to an MPEG TS and multicast it to the pre-programmed multicast address and port. Similarly, if an RTSP stream 825 is used, the same process takes place at 830 using the RTSP as a protocol instead of HTTP.

If a list of files in a playlist 832 is in use "M3U," the list can be obtained using an HTTP GET request made to the caching server. Each file can then be streamed to the multicast address and port of record 838 until all elements of the playlist are completed and played back 835.

In some instances, metadata can be added to the stream as an additional PID (Program Identifier) in the MPEG Transport Stream. If metadata is needed 841 then it will be inserted 842 here in accordance with FIG. 9.

For example, the metadata added could be as simple as a string containing Artist, Name, or other information, or as complex as DCII Text (DigiCipher version 2, as specified by Motorola), MPEG TS Control messages (Two-way), or any other metadata or PID that can be inserted into the stream being sent to the multicast address and port.

Figure 9:
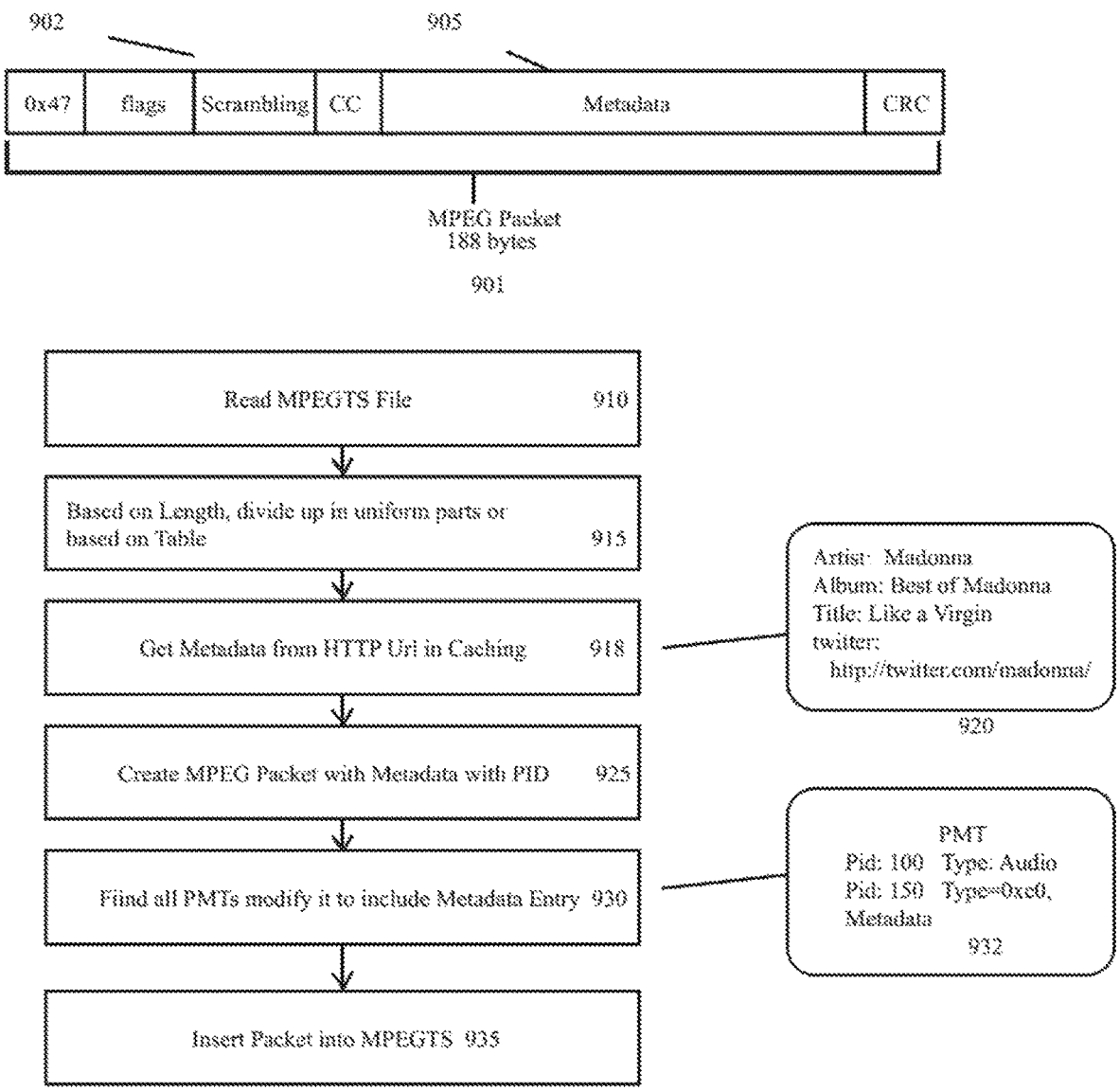
FIG. 9 shows an example method to insert metadata into in an MPEG Transport Stream.

FIG. 9 illustrates an example method used to insert a special data packet into the stream being written to the multicast address, without making use of timing information. Therefore, the metadata can be inserted such that it does not have timing dependency. Alternatively, certain type of metadata such as subtitles or lyrics may need to be inserted only at certain times so that it is synchronized with the video data.

The sample MPEG TS packet shown in 902 and 905 corresponds to the metadata inside the packet. This matches standard MPEG TS packet structure and may vary depending on the type of metadata being added to the stream.

The method to insert the packet starts by reading the MPEG TS file retrieved from the caching server 910. If metadata corresponds to only song information, this information can be added at uniform times. Non-uniform timing inclusions can also be done by adding a table that includes the time and the metadata content added to the stream 915. This metadata can be retrieved from the Caching unit using an HTTP Get request directed to the caching server 918 and may include artist name, title of song, or any other information 920.

Creation of the MPEG Packet(s) 925 to be inserted at the appropriate times, which will set the places with those packets, will be inserted in the MPEG TS. Modify the PMT (Program Management Table) of the generated file and include the PID being inserted into the MPEG TS 930. At step 932, an audio PID may include a metadata PID of type DCII Text, which is added to the stream.

For each timing or location where the PID needs to be inserted 935, the method can insert those packets and generate a buffer that can be sent to the multicast address as in illustrated in FIG. 8.

As described above, the disclosed technology can be implemented using a set of modules included in the Mediaplug apparatus, which can be implemented using one or more servers accordingly. Alternatively, virtualization environments such as VMWare or Xen (FIG. 9) can include a system and architecture that can be used to host all the Mediaplug functionality in a virtualized environment using a single server with multiple GbE ports.

Figure 10:
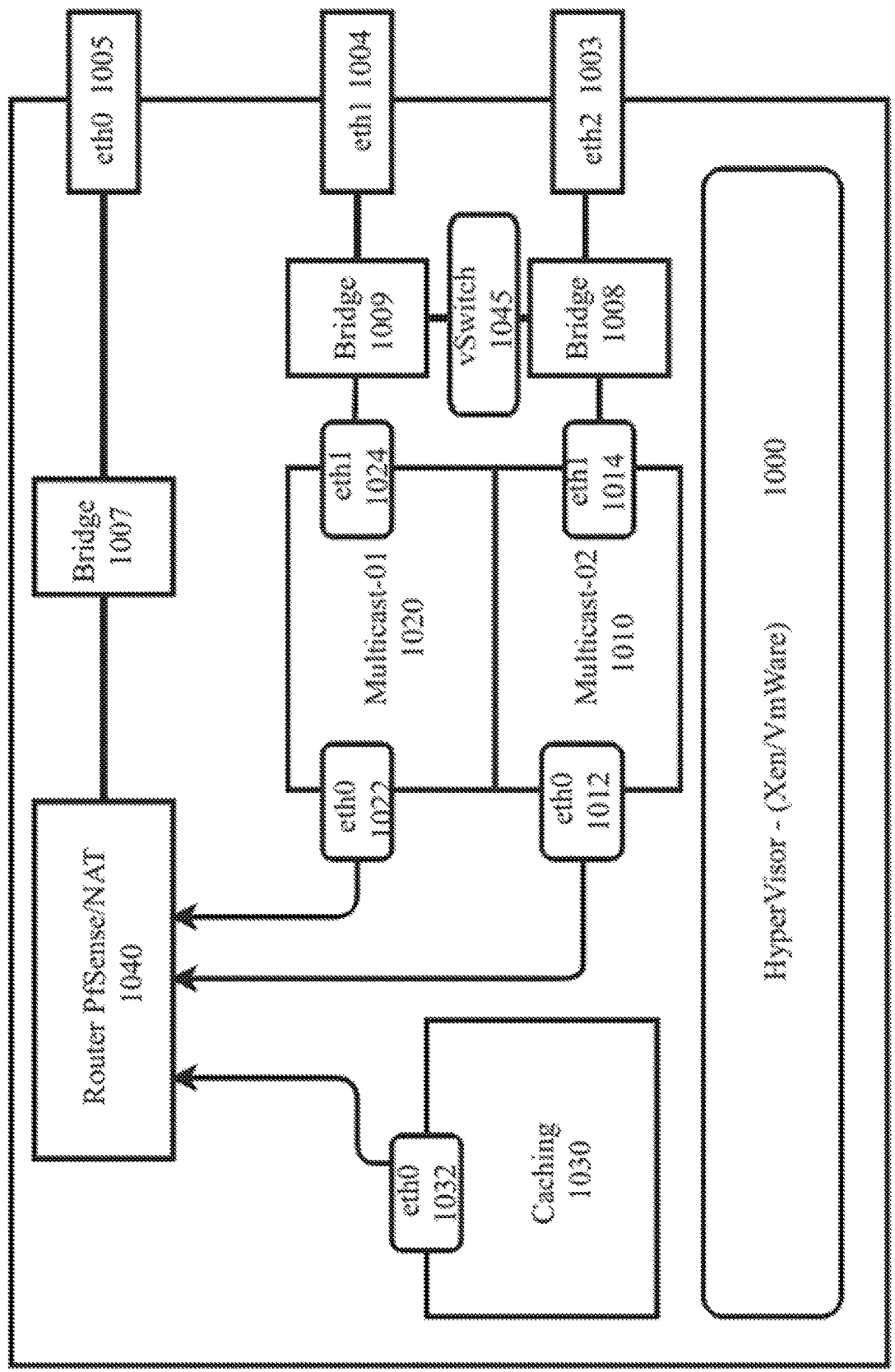
FIG. 10 shows an example block diagram for a Virtualized Mediaplug

The illustration in FIG. 10 shows a configuration of three virtual machines used for implementing the Mediaplug. Caching 1030 and its respective Ethernet port 1032, Multicast-01 1020 with two virtual Ethernet ports 1022 and 1024, and Multicast-02 1010, with two Ethernet ports 1012 and 1014. There are three bridges that include 1007, 1008, and 1009. The multicast Ethernet ports 1024 and 1014 are bridged with eth1 1004 and eth2 1003 respectively via bridge 1009 and bridge 1008, respectively. That is, the same content generated at 1024 can be forwarded via the bridge 1009 to the physical interface eth1 1004 in the hardware. The vSwitch 1045 or the virtual switch between the two bridged interfaces 1008 and 1009 permits the two virtual machines of Multicast-01 1010 and Multicast-02 1020 to record each other and monitor their activity.

Figure 11:
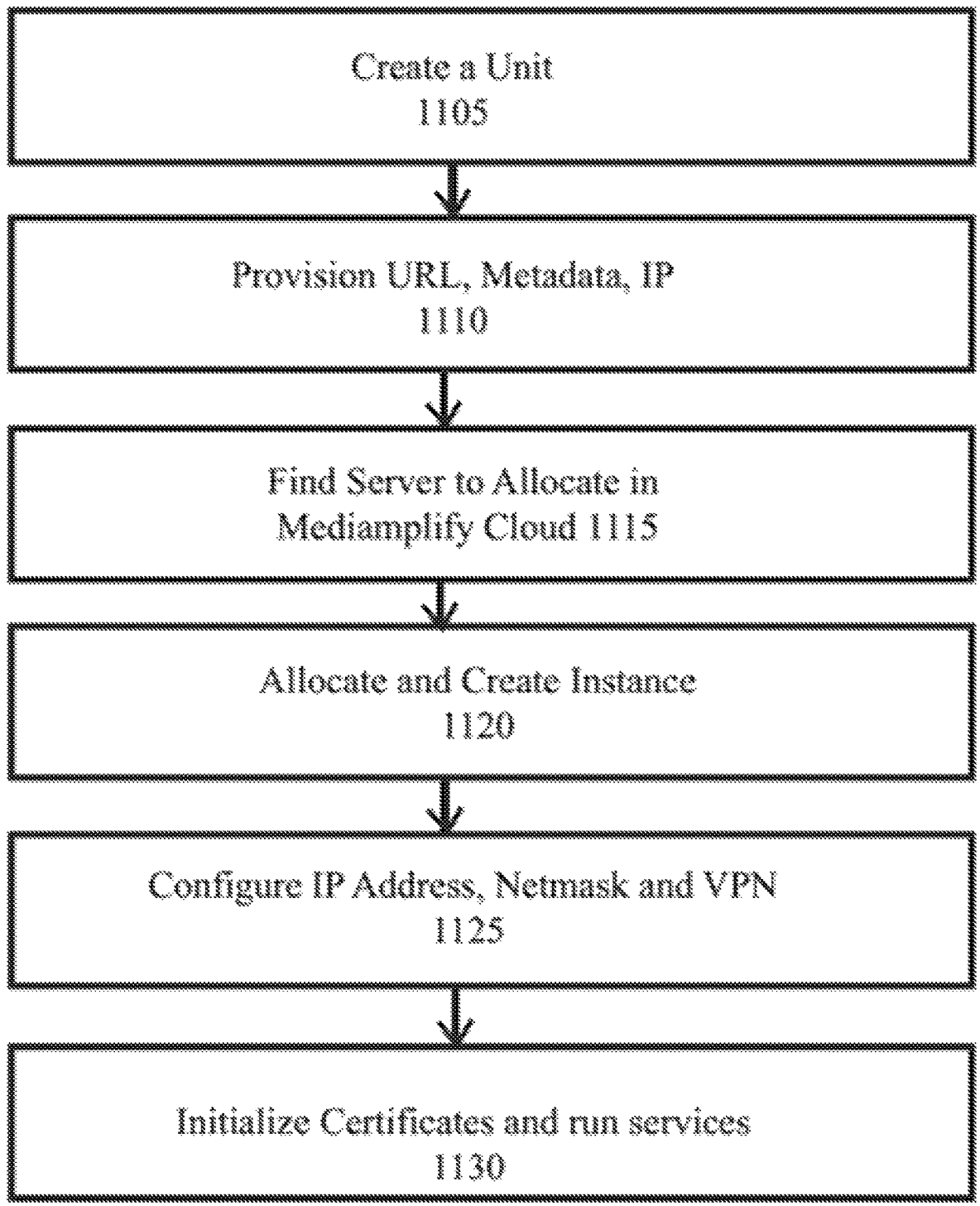
FIG. 11 shows an example method to initialize virtual mediaplug components.

To achieve concurrency and proper execution in a cloud environment, the Mediaplug can use the example method shown in FIG. 11. Once a create unit command is issued 1105, provisioning of the metadata information and proper IP Address is provided for that particular instance 1110. Once an IP Address and metadata has been chosen for the unit, the server can be allocated in the cloud and the instance can be created using CloudStack or OpenStack tools and services 1115. The instance is then allocated and runs in the proper node in the cloud 1120. Configuration of the assigned IP, Netmask, and VPN credentials are loaded at 1125. Finally, certificate information is uploaded 1130 as well as all services run to enable the unit for execution of its caching functions, multicasting functions, or both.

Figure 12:
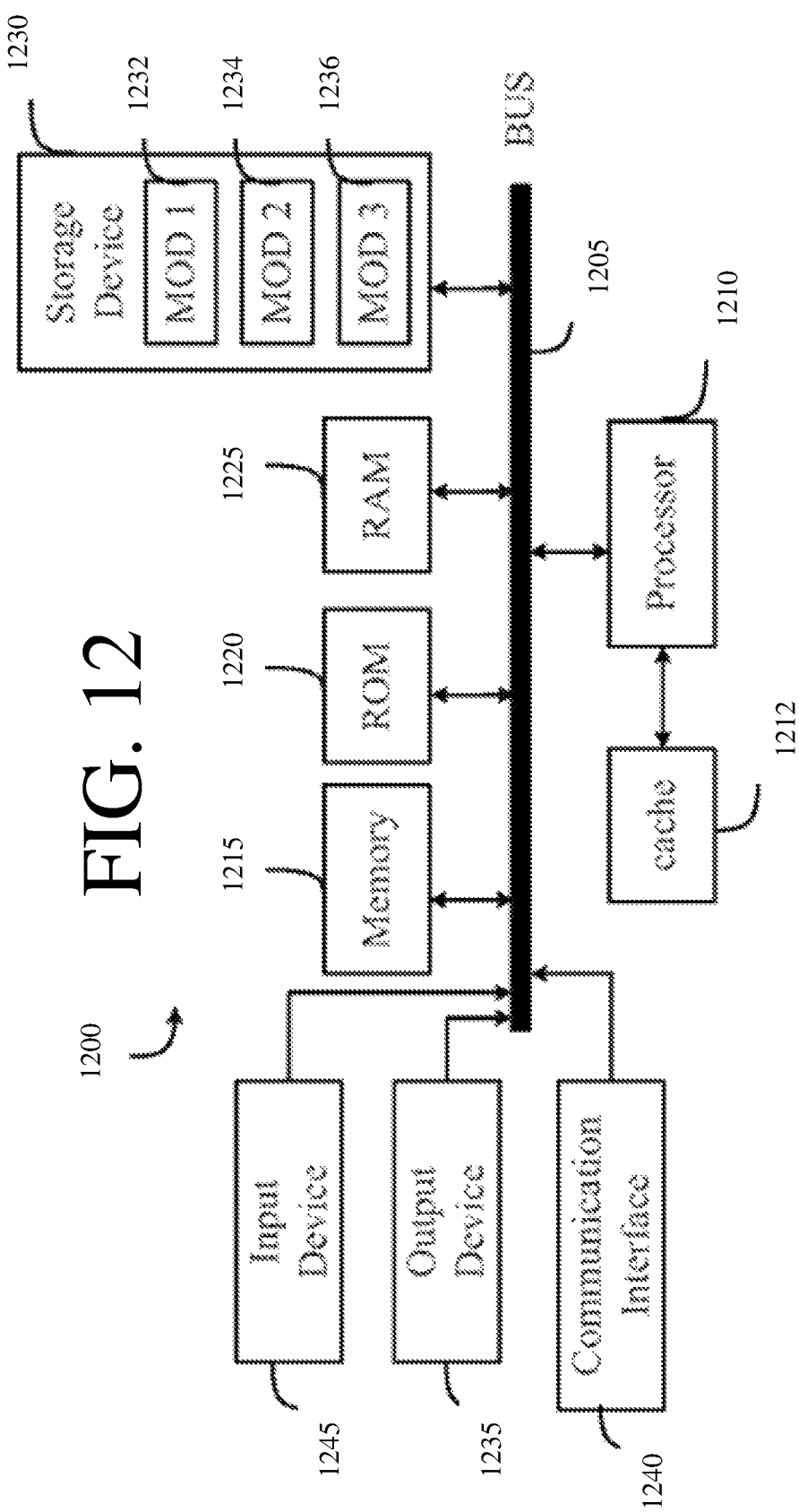
FIG. 12 shows an example possible system embodiment for implementing various embodiments of the present technology While the present technology is amenable to various modifications and alternative forms, specifics thereof have been shown by way of example in the drawings and will be described in detail. It should be understood, however, that the intention is not to limit the present technology to the particular embodiments described. On the contrary, the intention is to cover all modifications, equivalents, and alternatives falling within the spirit and scope of the present technology.

FIG. 12 illustrates a conventional system bus computing system architecture 1200 such as can be used in Mediaplug 110. Those of ordinary skill in the art will appreciate that other system architectures are also possible.

In computing system architecture 1200 the components of the system are in electrical communication with each other using a bus 1205. Example system 1200 includes a processing unit (CPU or processor) 1210 and a system bus 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, display 1235, and so forth, to carry out the function.

It can be appreciated that example system 1200 can have more than one processor 1210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, comprising:
   receiving, from a content provider, a request for at least one media stream for playback on a broadcast media channel, wherein the at least one media stream includes a plurality of multimedia items of different types;
   obtaining content corresponding to the plurality of multimedia items from at least one source offering the content in at least one first format;
   rendering a web page by a browser using the content;
   generating a temporal sequence of screen captures of the rendered web page, where each screen capture defines all the content of the web page at a given time, and at least two adjacent screen captures illustrate a dynamic change of at least a portion of the content over time;
   assembling the at least one media stream using the temporal sequence of screen captures; and
   providing the at least one media stream to the content provider for broadcast on the broadcast media channel;

wherein the at least one media stream corresponds to at least one of an HTTP live stream (HLS), an HTTP playlist, and a Real-time Streaming Transport (RTSP) stream; and wherein the web page is rendered in parallel in multiple threads.

2. The method according to claim 1, wherein the at least one media stream is interacted with MPEG two way control messages.

3. The method according to claim 1, wherein MPEG messages are sent to a service provider via a unicast address.

4. A computer-implemented method, comprising:
receiving, from a content provider, a request for at least one media stream for playback on a broadcast media channel, wherein the at least one media stream includes a plurality of multimedia items of different types;
obtaining content corresponding to the plurality of multimedia items from at least one source offering the content in at least one first format;
rendering a web page by a browser using the content;
generating a temporal sequence of screen captures of the rendered web page, where each screen capture defines all the content of the web page at a given time, and at least two adjacent screen captures illustrate a dynamic change of at least a portion of the content over time;
assembling the at least one media stream using the temporal sequence of screen captures; and
providing the at least one media stream to the content provider for broadcast on the broadcast media channel;
wherein assembling the at least one media stream comprises inserting at least one MPEG packet including metadata corresponding to the multimedia item; and
wherein the web page is rendered in parallel in multiple threads.

5. The computer-implemented method of claim 4, wherein the at least one media stream is interacted with MPEG two way control messages.

6. The computer-implemented method of claim 4, wherein MPEG messages are sent to a service provider via a unicast address.

7. A system, comprising:
a multicast server configured to generate parameters relating to at least one of video content, image content and audio content, and configured to output the parameters via MPEG outputs;
a caching server communicatively coupled to the multicast server, and configured to
receive and store the parameters,
create a temporal sequence of screen captures of a rendered web page, where each said screen capture defines content of the rendered web page at a given time, and at least two adjacent screen captures in the temporal sequence illustrate a dynamic change of at least a portion of the video content, image content or audio content over time,
assemble the temporal sequence of screen captures, and
provide at least one of the video content, image content and audio content to the multicast server for generating a multicast stream with MPEG encoded video and audio; and
a monitoring system configured to maintain generation of video and audio files, even in failure cases.

8. The system according to claim 7, further comprising multiple servers for load balancing and fault-tolerance.

9. The system according to claim 7, wherein the multicast server is selected to communicate a multicast stream available for a broadband network.

10. The system according to claim 7, wherein the video content is encoded in a video streaming format so as to generate a unicast stream.

11. The system according to claim 7, wherein the system generates audio MPEG files and add metadata in an MPEG frame.

12. The system according to claim 7, wherein the system generates MPEG metadata that is interacted with two way broadcast TV systems.

13. A computer-implemented method, comprising:
receiving, from a content provider, a request for at least one media stream for playback on a broadcast media channel, wherein the at least one media stream includes a plurality of multimedia items of different types;
obtaining content corresponding to the plurality of multimedia items from at least one source offering the content in at least one first format;
rendering a web page by a browser using the content;
generating a temporal sequence of screen captures of the rendered web page, where each screen capture defines all the content of the web page at a given time, and at least two adjacent screen captures illustrate a dynamic change of at least a portion of the content over time;
assembling the at least one media stream using the temporal sequence of screen captures; and
providing the at least one media stream to the content provider for broadcast on the broadcast media channel;
wherein the at least one media stream corresponds to at least one of an HTTP live stream (HLS), an HTTP playlist, and a Real-time Streaming Transport (RTSP) stream; and
wherein the web page is rendered in parallel in virtual instances or virtual machines.

* * * * *